Figure 1:
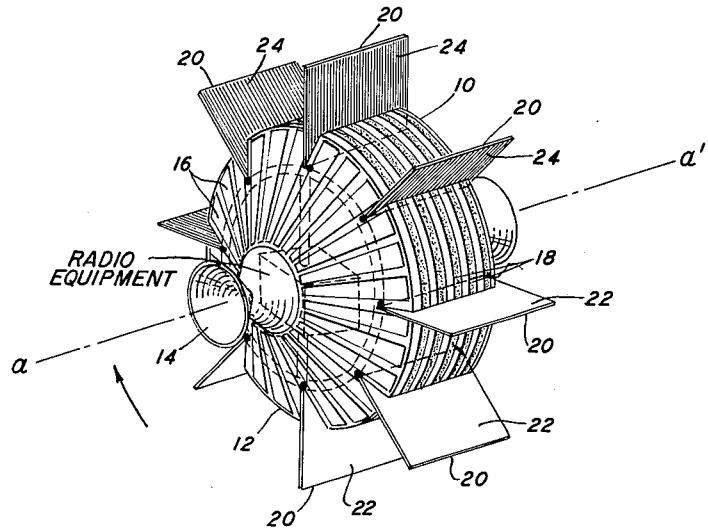

Oct. 9, 1962     C. C. CUTLER ETAL     3,057,579

STABILIZATION OF EARTH SATELLITE REPEATERS

Filed June 23, 1959

INVENTORS C. C. CUTLER
J. R. PIERCE
BY

ATTORNEY 3,057,579
STABILIZATION OF EARTH SATELLITE REPEATERS
Cassius C. Cutler, Gillette, and John R. Pierce, Berkeley Heights, N.J., assignors to Bell Telephone Laboratories, Incorporated, New York, N.Y., a corporation of New York
Filed June 23, 1959, Ser. No. 822,334
6 Claims. (Cl. 244—1)

This invention relates to earth satellites and more particularly to spinning earth satellites to be used as repeaters in point-to-point communication systems.

Communication systems have been proposed in which transmission may be effected between two points on the surface of the earth through the use of an earth satellite which serves as either an active or a passive repeater. The use of such repeaters permits relaxation of the well-known limitations upon line-of-sight transmission and at the same time provides facilities for the transmission of broadband signals. One of the problems involved in the use of such repeaters, whether they be active or passive, is that of maintaining the orientation of the antennas or reflecting surfaces carried by the repeater so that signals may be redirected in a predetermined direction.

One method heretofore proposed for effecting control of the orientation of such a repeater involves launching the satellite with an initial spin about the axis of the greatest moment of inertia and with this axis oriented at right angles to the plane of the desired satellite orbit. This method of orientation control is effective so long as the initial spin persists. However, the flow of eddy currents induced in the metallic portions of the satellite by the earth's magnetic field exercises a damping effect which unless compensated is sufficient to brake the initial spin and cause a loss of orientation. Micrometeorites and other effects can also cause damping of the initial spin. Such damping can occur within a finite period which is short as compared to the desired satellite life and may be of the order of a few days or weeks, whereas the desired life of a satellite to be used as a communication repeater is of the order of years at a minimum.

It is accordingly the object of the present invention to eliminate the limitation placed upon spin orientation of earth satellite repeaters by the damping effect of the earth's magnetic field and by other influences tending to degrade the initial spin of the satellite.

In accordance with the present invention, braking or degradation of the spin of an earth satellite repeater launched with an initial spin about the axis of the greatest moment of inertia is compensated or eliminated by means which act to maintain or accelerate the spin of the satellite about the chosen axis. For this purpose radial vanes are mounted on the periphery of the satellite and rotate therewith for successive presentation to solar energy. Such successive presentation of the vanes to solar energy is accomplished whenever at least the majority of vanes is so mounted that each has at least a projected area lying in a plane including the spin axis of the repeater. One surface of each vane is treated to reflect incident energy and the other surface to absorb it. By appropriate arrangement of the vanes an unbalanced force is produced by incident solar energy and a torque tending to maintain the spin of the satellite results.

Figure 2:
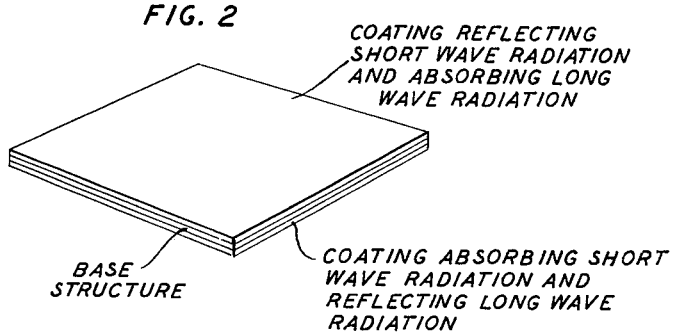

The above and other features of the invention will be considered in detail in the following specification taken in connection with the drawings, in which:

FIG. 1 is a perspective view of an earth satellite repeater arranged in accordance with the invention for maintenance of spin stabilization; and FIG. 2 is a perspective view showing details of one form of a vane which may be employed with the satellite of FIG. 1.

As shown in FIG. 1, an earth satellite repeater for communication purposes may conveniently comprise a generally cylindrical body 10 with an axis of principal moment of inertia corresponding to axis $aa'$ of FIG. 1. Conveniently, the ends of the cylinder may be of frusto-conical form, as shown for example at 12 in FIG. 1, and may provide a mounting base for a biconical horn antenna 14. As so mounted, antenna 14 will have a radiation pattern concentrated generally in a plane normal to rotational axis $aa'$. Such antennas as shown may be mounted at either end of cylindrical body 10, or other forms of antennas or reflectors may be provided depending upon the use to be made of the satellite.

If the satellite thus far described is launched with an initial spin about the axis $aa'$, and this axis is aligned at launch to be normal to the plane of the desired orbit, the spin of the satellite will tend to maintain this initial alignment. Typically, and as shown in FIG. 1, the satellite repeater may be an active repeater and may include radio transmission and reception equipment within its body. Power for the operation of such equipment or for other purposes may be obtained through the provision of solar batteries which, in accordance with the principles disclosed in Patent 2,780,765 to D. M. Chapin, C. S. Fuller and G. L. Pearson, February 5, 1957, convert incident solar energy into electrical current. Such batteries may be mounted on the faces of the frusto-conical ends of cylindrical cylinder 10 and may appear as wafers 16 disposed radially thereupon. It will be understood that both ends of the cylinder may be provided with such wafers and that appropriate electrical interconnections may be made so that at least some of the wafers receive solar energy and provide operating currents for the internal equipment of the satellite at all times.

In addition, it may be desirable to provide peripheral conducting bands or strips such as 18 on the surface of the satellite arranged to couple with the earth's magnetic field and to provide damping currents flowing in planes normal to the spin axis and thus tending to reduce precession of rotational axis $aa'$.

In order to maintain the desired orientation of axis $aa'$ for any extended period of time, it is necessary to provide means for positively driving or rotating the satellite about this axis to maintain a sufficient spin of the satellite. According to the present invention, this is accomplished by utilization of the radiation pressure resulting from energy incident upon the satellite from the sun. For this purpose radial vanes 20 are mounted about the periphery of the satellite and are successively presented to incident radiation from the sun as the satellite rotates about the axis of the greatest moment of inertia. The respective first faces of vanes 20, as for example faces 22, are coated or otherwise provided with a reflecting surface while the second face of each of the vanes, as for example faces 24, are made absorptive either by coating or other suitable surface treatment.

Solar energy incident upon the reflecting or shiny faces of vanes 20 exerts a force upon these faces tending to rotate the satellite in a clockwise direction as seen from the end bearing antenna 14. Both the radiation pressure of the incident energy and the force exerted by energy reflected from the shiny surfaces 22 of the several vanes act in the direction causing the vanes to retreat from the source of solar energy, thus tending to promote rotation of the satellite in the direction indicated in FIG. 1.

At the same time, however, energy incident on the absorbing surfaces of the vanes is absorbed and later reradiated. Here, too, a force is exerted upon absorption and again upon reradiation of such energy. It will be recognized that these forces are in opposition to those acting on the shiny surfaces of the vanes and would appear to balance out any net torque about rotational axis $aa'$. It should be noted, however, that reflection from the shiny surfaces is specular or mirrorlike and thus concentrated in a predetermined direction. On the other hand, radiation from the absorbing and reradiating surface is diffuse and is distributed essentially over a hemispheric volume. A net unbalance is thus produced between the radiation forces acting on the two sides of each vane, and this is sufficient in the vacuum of outer space and acting over an extended period of time to drive or accelerate the satellite about axis $aa'$ to rather considerable angular velocities.

According to a further feature of the invention, however, means may be provided for accentuating the unbalance between the forces acting on the two faces of vanes 20. For example, if a heat source or a heat sink having a temperature differing from that of the vanes is connected thereto, the amount of energy reradiated from the absorptive surfaces 24 of the vanes may be controlled or modified. Such a heat source may comprise, for example, the excess heat generated by the electronic transmitting and receiving equipment within the satellite and furnished with power by the solar batteries referred to above. If heat from such a source were conducted to vanes 20, the amount of energy radiated therefrom may even be made of sufficient magnitude to overcome the forces acting on the vanes as the result of the radiation pressure of solar energy and may cause rotation of the satellite in the opposite direction about axis $aa'$. Of more practical interest, however, may be the case wherein the net temperature of the satellite as a whole may be made less than that of the vanes. This may be accomplished, for example, by appropriate choice of the relationship between the total area of the satellite coated with reflecting material such as silver paint and that area covered with absorbing material as, for example, black paint. In this manner it is quite easy to adjust the temperature of the satellite body as a whole to be lower than that of the several vanes 20. The body of the satellite then serves as a heat sink to which may flow some portion of the energy absorbed by the dark or absorbing surfaces of vanes 20 with the net result that the amount of energy reradiated from these surfaces is materially reduced thus augmenting the unbalanced force tending to rotate the satellite in a clockwise direction as indicated in FIG. 1.

In addition to the above expedients, the net forces acting to promote rotation of the satellite in the desired direction may be increased by appropriate selection of the surface characteristics of vanes 20. Thus, and as shown in the sectional representation of FIG. 2, vanes 20 may each comprise a base structure, one face of which is treated to reflect short wave radiation and absorb long wave radiation or is coated with a material having these properties. Since energy incident from the sun is typically of short wavelength and high temperature, while that radiated from the vane is of longer wavelength and lower temperature, it will be seen that a vane having the surface characteristic just mentioned will act to promote the unbalance of forces required. Thus, because of the reflection of the short wave radiation, the forces of solar energy acting on the reflecting surface will remain unchanged. On the other hand, energy absorbed by the second surface 24 of the vane will be reradiated partially by that second surface and partially by the first surface which is at the same time reflecting the short wave incident energy from the sun.

Such unbalance of resultant forces can be maximized if the second surface 24 of the vane is treated to absorb short wave radiation and to reflect long wave radiation or is provided with a coating having these characteristics.

It will be seen that if surface 24 is so treated it will be rendered less able to reradiate the heat absorbed from incident solar energy and such energy must therefore be reradiated from the first surface 22 which, as pointed out above, may be appropriately treated to promote such radiation.

An appropriate surface treatment or coating for the first surface 22 to promote the reflection of short wave radiation and the absorption of long wave radiation as required in accordance with the above may consist of a glass or, alternatively, of a layer of carbon black or similar absorptive material overlaid by a partially reflecting layer of deposited aluminum or similar metal. An appropriate coating for the second surface 24 which will act to absorb short wave radiation and reflect long wave radiation may be formed of laminated materials according to the principles embodied in many of the protective screens proposed for preventing radar detection of targets by absorbing incident microwave energy. Since these commonly depend upon spacings between layers related to the wavelength of the energy to be absorbed, a structure designed to absorb short wavelength radiation will reflect radiation of non-harmonically related longer wavelengths. Alternatively, a composite structure having layers of appropriately chosen refractive indices to provide selective absorption of particular wavelengths may be employed. Such structures are disclosed, for example, in Patent 2,875,435 to E. B. McMillan, February 24, 1959.

It will, of course, be obvious that any combination of the expedients outlined above for producing a net unbalance in the forces acting on opposite sides of the several drive vanes may be employed. For example, it may be desirable to coat the opposite faces of the vanes as indicated in FIG. 2 and at the same time to treat the body of the satellite in such a way as to cause its net temperature to be lower than that of the vanes themselves. In this manner the torque tending to maintain spin of the satellite may be maximized.

What is claimed is:

1. In a space satellite launched with an initial spin about the axis of greatest moment of inertia and with said axis normal to the plane of the desired orbit, means for maintaining the spin of the satellite despite damping influences comprising a plurality of vanes spaced about the periphery of the spinning satellite for successive presentation to incident solar energy, at least the majority of said vanes having projected areas lying respectively in planes including said spin axis, a reflecting surface on the first face of each of said vanes, an absorbing surface on the opposite face of each vane, and means for augmenting the unbalance between the radiation forces produced on opposite faces of each vane by solar energy as the satellite rotates.

2. In a space satellite launched with an initial spin about the axis of greatest moment of inertia and with said axis normal to the plane of the desired orbit, means for maintaining the spin of the satellite despite damping influences comprising a plurality of vanes spaced about the periphery of the spinning satellite for successive presentation to incident solar energy, at least the majority of said vanes having projected areas lying respectively in planes including said spin axis, a reflecting surface on the first face of each of said vanes, an absorbing surface on the second face of each vane, a reservoir for thermal energy within the satellite, and means for interconnecting said reservoir and said plurality of vanes.

3. In a space satellite launched with an initial spin about the axis of greatest moment of inertia and with said axis normal to the plane of the desired orbit, means for maintaining the spin of the satellite despite damping influences comprising a plurality of radial vanes spaced about the periphery of the spinning satellite, at least the majority of said vanes having projected areas lying respectively in planes including said spin axis, a reflecting coating on the first face of each of said vanes, an absorbing coating on the opposite face of each vane, radio transmission equipment within the satellite, a source of operating currents therefor, and means for conducting heat generated by said transmission equipment to said vanes.

4. In a space satellite launched with an initial spin about the axis of greatest moment of inertia and with said axis normal to the plane of the desired orbit, means for maintaining the spin of the satellite despite damping influences comprising a plurality of vanes spaced about the periphery of the spinning satellite for successive presentation to incident solar energy, at least the majority of said vanes having projected areas lying respectively in planes including said spin axis, a coating on the first face of each of said vanes reflecting short wave radiation and absorbing long wave radiation, and a coating on the opposite face of each vane absorbing incident radiation.

5. In a space satellite launched with an initial spin about the axis of greatest moment of inertia and with said axis normal to the plane of the desired orbit, means for maintaining the spin of the satellite despite damping influences comprising a plurality of vanes spaced about the periphery of the spinning satellite for successive presentation to incident solar energy, at least the majority of said vanes having projected areas lying respectively in planes including said spin axis, a coating on the first face of each of said vanes reflecting short wave radiation and absorbing long wave radiation, and a coating on the opposite face of each of said vanes absorbing short wave radiation and reflecting long wave radiation.

6. In a space satellite launched with an initial spin about the axis of greatest moment of inertia and with said axis normal to the plane of the desired orbit, means for maintaining the spin of the satellite despite damping influences comprising a plurality of vanes spaced about the periphery of the spinning satellite for successive presentation to incident solar energy, at least the majority of said vanes having projected areas lying respectively in planes including said spin axis, coatings on the first face of each of said vanes reflecting short wave radiation and absorbing long wave radiation, a coating on the second face of each vane absorbing short wave radiation and reflecting long wave radiation, a heat sink within the body of said satellite, and means for connecting each of said vanes to said heat sink.

References Cited in the file of this patent

UNITED STATES PATENTS

| 182,172 | Crookes | Sept. 12, 1876 |
| 2,835,548 | Baumann | May 20, 1958 |

OTHER REFERENCES

Aviation Week Magazine, page 93 relied upon, April 27, 1959.